UNITED STATES PATENT OFFICE.

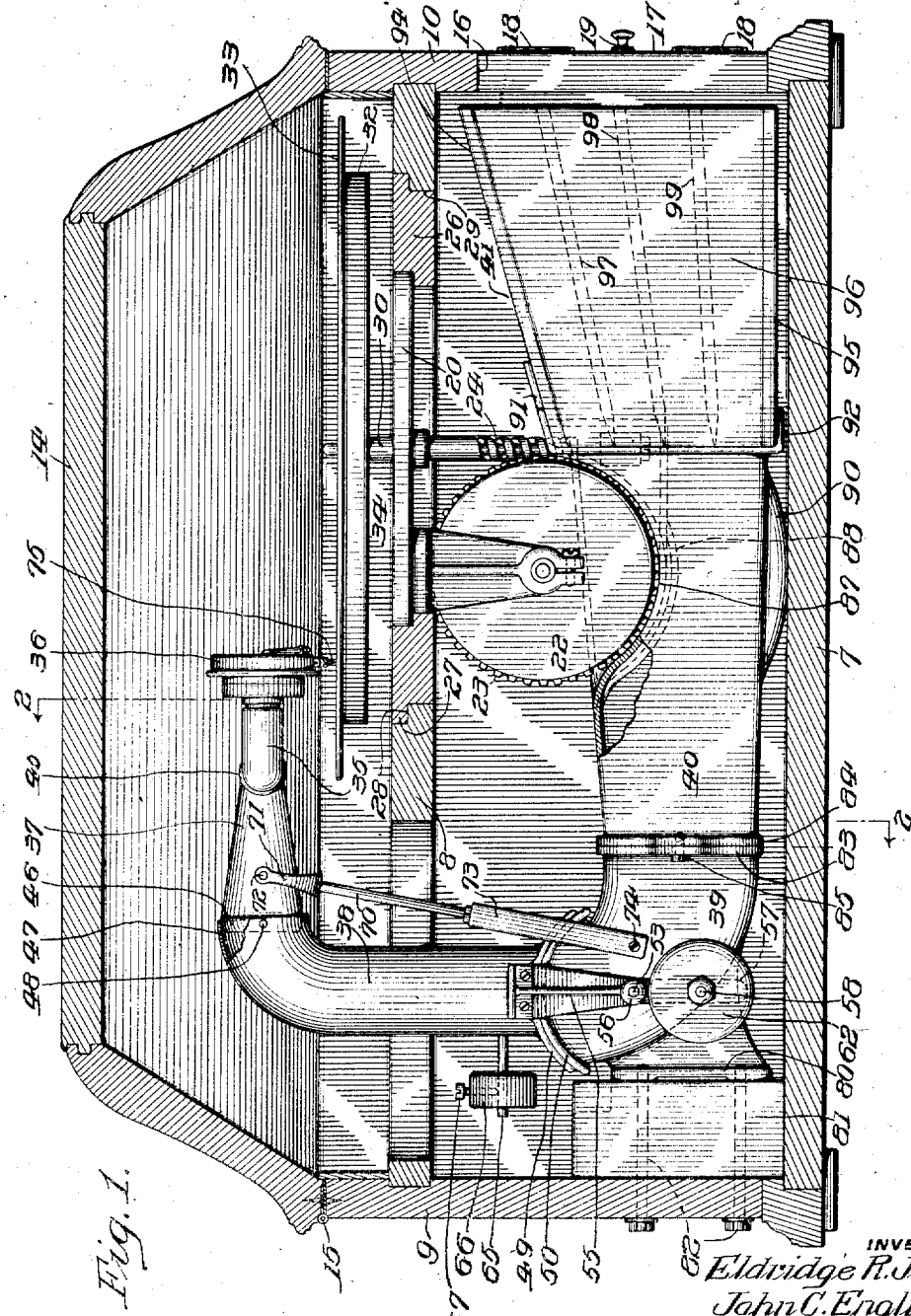

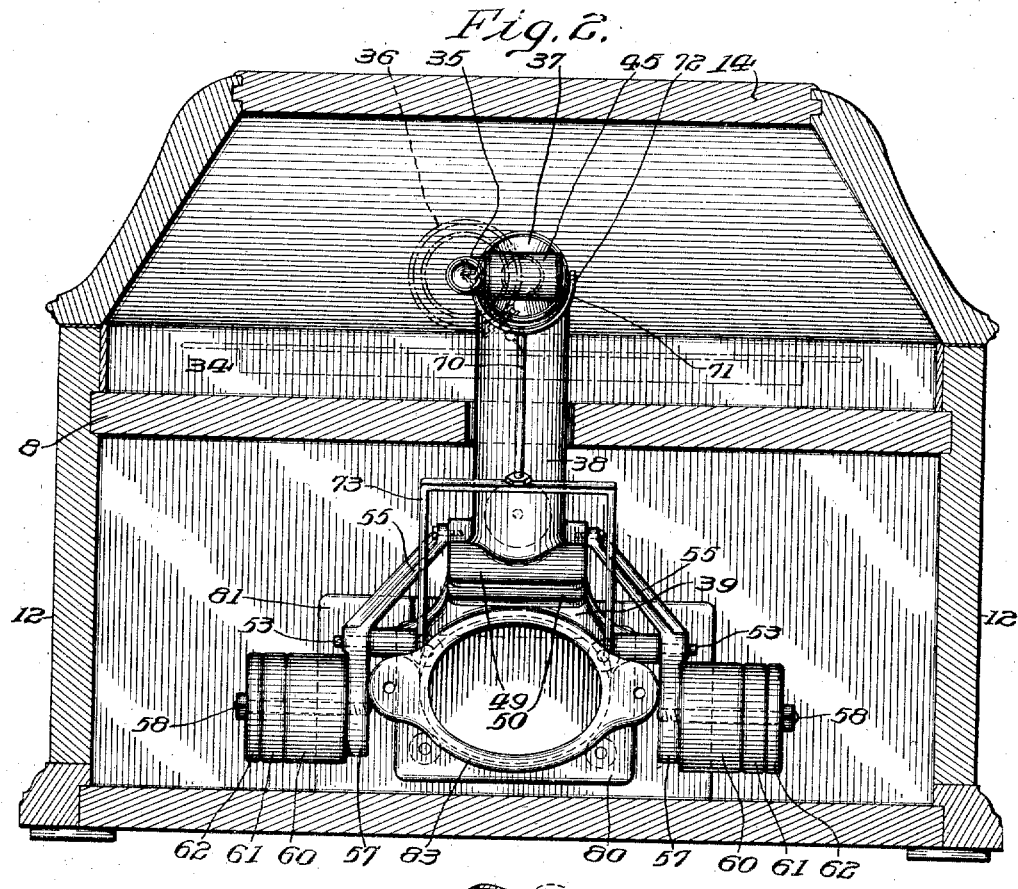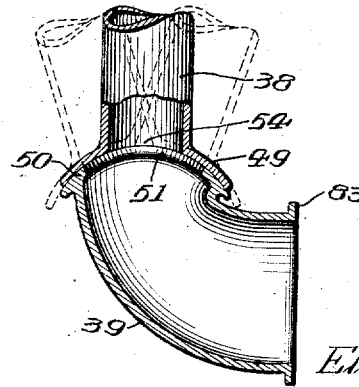

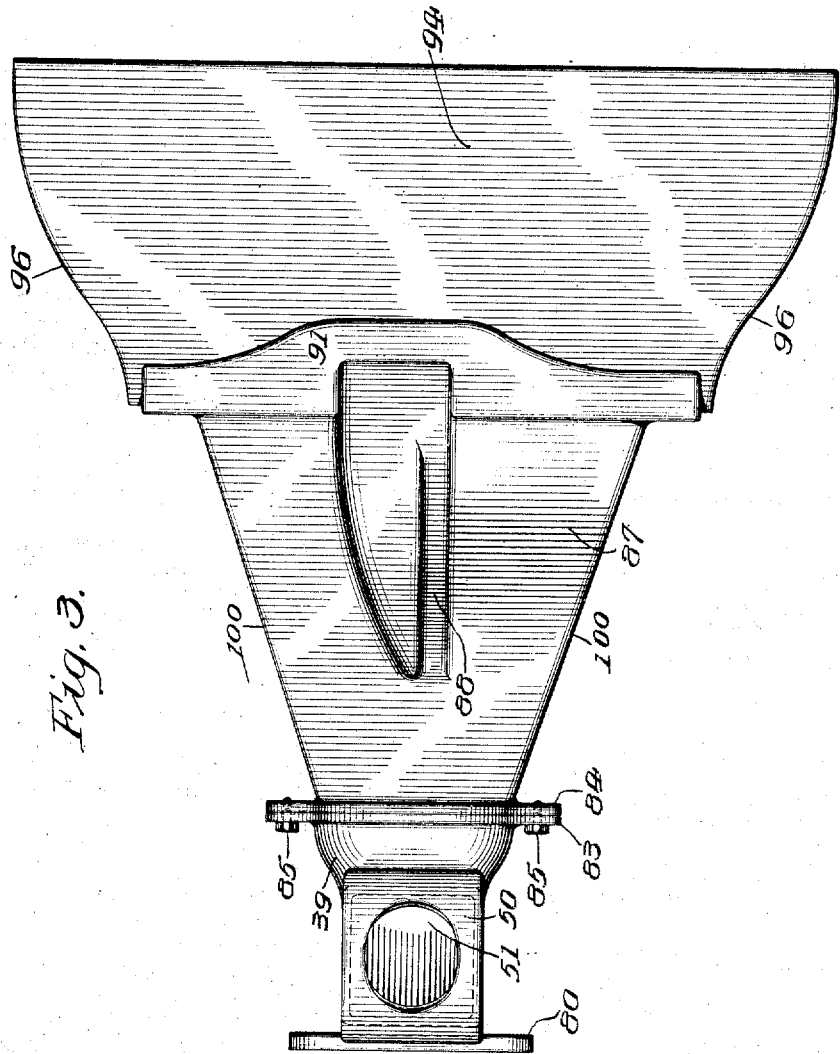

ELDRIDGE R. JOHNSON, OF MERION, PENNSYLVANIA, AND JOHN C. ENGLISH, OF CAMDEN, NEW JERSEY, ASSIGNORS TO VICTOR TALKING MACHINE COMPANY, A CORPORATION OF NEW JERSEY.

TALKING-MACHINE.

1,075,288.    Specification of Letters Patent.    Patented Oct. 7, 1913.

Application filed October 8, 1910. Serial No. 585,975.

*To all whom it may concern:*

Be it known that we, ELDRIDGE R. JOHNSON, a citizen of the United States, and a resident of Merion, in the county of Montgomery and State of Pennsylvania, and JOHN C. ENGLISH, a citizen of the United States, and a resident of Camden, in the county of Camden and State of New Jersey, have invented certain new and useful Improvements in Talking-Machines, whereof the following is a specification, reference being had to the accompanying drawings.

This invention particularly relates to the sound conveyer comprising a swinging arm and the parts operatively connected therewith.

The principal objects of this invention are, to provide a sound conveying arm coöperative with a sound record disk, to direct the point of a stylus needle in a rectilinear path, radial with respect to the axis of the sound record disk, and operative to maintain the vertical plane of the stylus needle at an invariable angle to a radial plane, and tangent to the respective convolutions of the spiral groove of the record disk, to reduce the wear upon the walls of the record groove, incident to the usual turning action of the needle relative to said walls; to provide a sound conveyer comprising relatively movable sections and having means to prevent leakage at the joints between said sections; and to provide means to reduce the height of the operative mechanism.

The form of this invention, hereinafter described, provides a talking machine with a sound conveyer, comprising a mounting for the sound reproducer; a movable sound conduit or swinging arm connected with said mounting by a relatively movable tapered hollow connecting arm, and a stationary sound conduit having an elbow connecting a sound amplifier with said movable conduit or swinging arm; trunnions supporting said movable conduit on said elbow; trunnions supporting said tapered connecting arm with said movable conduit; a link connecting said tapered arm with said conduit elbow, operative to maintain said arm in a substantially horizontal plane; a motor operative to rotate a record disk in coöperative relation with a stylus needle carried by said sound reproducer; a recess in said stationary conduit arranged to receive said motor, to reduce the height of the operative mechanism and the casing inclosing the same; and balancing mechanism operative to counterbalance the weight of the movable parts of said sound conveyer.

This invention further includes all of the various novel features of construction and arrangement hereinafter more definitely specified.

In the accompanying drawings, Figure 1 is a central vertical longitudinal sectional view of a talking machine constructed in accordance with this invention, showing the inclosed mechanism in elevation, for convenience of illustration; Fig. 2 is a transverse vertical sectional view of said machine taken on the line 2—2 in Fig. 1; Fig. 3 is a plan view of the stationary part of the sound conveyer and its amplifier; Fig. 4 is a fragmentary vertical longitudinal sectional view of the conduit elbow and the movable conduit or swinging arm carried thereby, showing the intermediate position in full lines, and the opposite extreme positions in dot and dash lines.

In said figures, the talking machine casing comprises the bottom board 7, the top board 8, the end walls 9 and 10, the side walls 12, and the cover 14 hingedly secured at 15 to said end wall 9. The end wall 10 is provided with an aperture 16 arranged to be closed by the doors 17, which are provided with hinges 18 and a knob 19 for their convenient manipulation, to vary the volume of sound emitted by the sound amplifier, to be hereinafter described.

The motor mechanism, comprising the base plate 20, spring barrel 22, worm-gear 23 and worm 24, is carried by the frame 26, which has a flange 27 at its perimeter, supported upon the ledge 28 surrounding the aperture 29 in the top board 8, so that, as may be readily seen, the motor mechanism is free to be removed from the casing for adjustment or repairs. The worm 24 provides a rotary stud 30, projecting above the plate 20 and carrying the turn-table 32, arranged to support a sound record disk 33, and to rotate said disk in the chamber 34, which is formed by the cover 14. The sound conveyer comprises a mounting 35 for the sound reproducer 36, a tapered arm 37, a movable conduit 38, a conduit elbow 39, a stationary conduit 40, and a sound amplifier 41.

The reproducer mounting 35 is arranged to turn on a horizontal axis in the barrel 45 at the outer free end of the tapered arm 37, and said tapered arm is provided with a substantially spherical flange 46, arranged to snugly fit the orifice 47 in the end of the movable conduit 38, and said spherical flange is operative to seal the joint thus formed in any position which said tapered arm may occupy relative to the conduit 38, when oscillated upon the trunnions 48, which serve to support said tapered arm 37.

The movable conduit or swinging arm 38 is provided with the curved flange 49, which conforms to the cylindriform curved flange 50 of the conduit elbow 39, which, as best shown in Fig. 4, has the aperture 51 in said flange 50, which is embraced by the flange 49, in any position which the swinging arm 38 may occupy, relative to the elbow 39, when oscillated upon the trunnions 53, and by reason of the close fit between the flanges 49 and 50, the escape of sound passing from the conduit 38 to the elbow 39 is prevented.

As shown in Fig. 4, the aperture 54 in the flange 49 is materially smaller than the aperture 51 in the flange 50, whereby substantially the full volume of sound passing through the conduit 38 will be received by the elbow 39 and directed thereby through the sound conduit 40. The movable sound conduit 38 is provided with the depending arms 55 having bearings 56 supported for oscillation upon the trunnions 53 which extend laterally from the elbow 39, each of said arms 55 having an extension 57, which is provided with a stud 58 projecting laterally therefrom and arranged to carry the counterweights 60, 61 and 62, operative to balance the movable portion of the conveyer comprising the swinging arm 38, tapered connecting arm 37 and mounting 35. The movable conduit 38 is also provided with a stud 65 arranged to support the weight 66, which is arranged to assist the weights 60, 61 and 62 in balancing and which is adjustable on said stud 65, and secured in any adjusted position by the set screw 67.

In order that the oscillation of the movable conduit or swinging arm 38 upon its trunnions 56 may maintain the tapered arm 37 in a horizontal position, a supporting link 70 is provided, having a yoke 71 pivotally connected by trunnions 72 with the tapered connecting arm 37, and a yoke 73 pivotally connected by trunnions 74 with the elbow 39.

It may be observed that the movement of the swinging arm 38 upon its trunnions 56 effects a movement of the point of the stylus needle 75 in a rectilinear path, radially with respect to the axis of the record disk 33 with which said needle 75 coöperates to reproduce the vibrations recorded in the grooves thereof, and which grooves effect the movement of the needle across the face of said record disk. The elbow 39 is provided with the supporting bracket 80, which is secured to the supporting block 81 by suitable bolts 82, and has the flange 83, which is secured to the flange 84 of the stationary sound conduit 40 by the bolts 85.

As economy of space is an essential factor in machines of the class described, the stationary sound conduit 40 is provided with a recess 87 arranged to receive the spring barrel 22, and the adjacent recess 88 arranged to receive the worm-gear 23. Said recess 87 is of sufficient extent, longitudinally, to receive the end of the worm 24 and its bearing, as shown in Figs. 1 and 3. A bulged projection 90 in the bottom wall of the conduit 40, substantially corresponding to the recesses 87 and 88, provides ample space for the passage of the sound waves through the conduit at the region of the recesses 87 and 88. The sound amplifier 41 is connected with the sound conduit 40 by the flanges 91 and 92 of said conduit, and comprises the top wall 94, bottom wall 95, and the side walls 96. Said top and bottom walls diverge from the mouth of the conduit 40, and diverging walls 97, 98 and 99 are interposed between said top and bottom walls 94 and 95 in substantially equally spaced diverging relation, as best shown in Fig. 1.

As best shown in Fig. 3, the lateral walls 100 of the conduit 40 diverge from the elbow 39, and the side walls 96 of the sound amplifier 41 diverge in ogee curves. It may be here noted that the movement of the point of the stylus needle in a plane coincident with the axis of the sound record disk, prevents said needle from being worn by the undulations in the walls of the record groove to a constantly changing sharp edge, as when said needle is progressed in the path of an arc; therefore, it is obvious that the life of the record is not only materially increased, but the slight unavoidable wear of the walls of the record groove is uniform throughout the entire length of said groove.

It is not desired to limit this invention to the precise details of construction and arrangement herein set forth, as it is obvious that various modifications may be made therein without departing from the essential features of the invention as defined in the appended claims.

Having thus described our invention, we claim:

1. In a talking machine, the combination with a horizontal turn-table, of a sound reproducer, a stylus operatively connected to said reproducer, a sound conduit, a hollow sound conveying arm communicating with said reproducer and pivotally connected to and communicating with said conduit and operative to be swung with respect thereto in a substantially vertical plane by engagement of said stylus with a record on said support to direct the point of said stylus in a straight line.

2. In a talking machine the combination with a horizontal turn-table, of a sound reproducer provided with a stylus, sound amplifying means, a hollow sound conveying arm communicating with said reproducer and pivotally connected to and communicating with said amplifying means, and operative to be swung with respect thereto in a substantially vertical plane by engagement of said stylus with a record on said support to direct the point of said stylus in a straight line radial to the axis of rotation of said record.

3. In a talking machine, the combination with a horizontal turn-table, of a sound reproducer, a stylus operatively connected to said reproducer, a sound conduit, a hollow sound conveying arm communicating with said reproducer, and pivotally connected to and communicating with said conduit and operative to be swung with respect thereto in a substantially vertical plane by engagement of said stylus with a record on said support to direct the point of said stylus in a straight line parallel with the plane of movement of said arm.

4. In a talking machine, the combination with a sound reproducer, of a stylus needle carried thereby, a swinging arm arranged to oscillate in a vertical plane, a hollow connector between said arm and reproducer, movable with respect to said swinging arm, and means to maintain said hollow connector in a horizontal plane, said arm being coöperative with a sound record, to direct the point of said stylus needle in a straight line radial to said record simultaneously with the vertical oscillation of said arm.

5. In a talking machine, the combination with a sound reproducer, of a stylus needle operatively connected therewith, and arranged to engage a sound record disk, a sound conveyer, comprising a swinging arm arranged to oscillate in a vertical plane, a hollow connector pivoted thereto, and arranged to connect said sound reproducer therewith, and means to maintain said hollow connector in horizontal position, said arm being arranged to coöperate with said record disk to direct the point of the stylus needle in a straight line radial to the axis of said disk simultaneously with the swinging movement of said arm.

6. In a talking machine, the combination with a sound reproducer, of a stylus needle carried thereby arranged to engage a sound record disk, a swinging arm pivoted for oscillation in a vertical plane, a hollow connector between said reproducer and said arm, and means arranged to maintain said connector in a horizontal position to reciprocate in a substantially rectilinear path, operative to direct the point of the stylus needle in a straight line, radial with respect to the axis of said record disk simultaneously with the swinging movement of said arm.

7. In a talking machine, the combination with a sound reproducer, of a stylus needle operatively connected therewith, coöperative with a sound record to effect the movement of said sound reproducer, a sound conveyer comprising a stationary section, a relatively movable section arranged to oscillate in a vertical plane, and a hollow pivoted connection between said movable section and said reproducer, arranged to reciprocate in a substantially straight line and operative to direct the point of the stylus needle in a line radial with respect to the axis of said sound record simultaneously with the oscillation of said movable section.

8. In a talking machine, the combination with a sound reproducer, of a stylus needle operatively connected therewith, a sound conveyer having a stationary section, and a movable section arranged to oscillate in a vertical plane, a hollow connecting arm pivoted to said movable section and arranged to connect said sound reproducer therewith, and a link connecting said arm and the stationary section of said conveyer, operative to maintain said connector in a substantially horizontal position, to direct the point of the stylus needle in a line radial with respect to the axis of the record disk.

9. In a talking machine, the combination with a horizontal disk record support, of a sound reproducer, a stylus needle operatively connected to said reproducer and arranged to engage a sound record disk on said support, a sound conveyer having a stationary section, and a relatively movable section arranged to operatively oscillate in a vertical plane, and means connecting said sound reproducer with said movable section, operative to direct the point of said stylus needle in a line radial to the axis of said disk, and to maintain said needle perpendicular to said line.

10. In a talking machine, the combination with a sound reproducer, of a stylus needle carried thereby, operatively engaged with a sound record disk, a sound conveyer comprising a stationary section, a movable section arranged to oscillate in a vertical plane on said stationary section, a hollow arm connecting said movable section and said reproducer, arranged to reciprocate horizontally, and means to counterbalance said movable section and the parts carried thereby, during the simultaneous movement of said movable section and the reciprocation of said reproducer.

11. In a talking machine, the combination with a sound reproducer, of a stylus needle carried thereby arranged to engage a sound record disk, a sound conveyer comprising a stationary section, a movable section, and a connection between said movable section and said sound reproducer, a link pivoted to said connection, and arranged to support the same in a horizontal position, and to direct the point of the stylus needle in a straight line radial to the axis of said record disk, and counterbalancing means carried by said movable section, operative to afford a light engagement of said stylus with the lateral walls of the record groove.

12. In a talking machine, the combination with a sound reproducer, of a stylus needle carried thereby operative to engage a sound record disk, a mounting for said sound reproducer, a hollow connector movably carrying said mounting, a swinging arm pivotally supporting said connector, and arranged to oscillate in a vertical plane, bearings forming the center of oscillation of said swinging arm, a stationary conveyer provided with trunnions for said bearings, and a link pivoted to said stationary conveyer, and to said connector in spaced relation from the pivotal supports of said arm and connector, operative to maintain said connector in horizontal position to be reciprocated by the oscillatory movement of said swinging arm, and to direct the point of the stylus needle in a rectilinear path.

13. In a talking machine, the combination with a sound reproducer, of a stylus needle carried thereby operative to engage a sound record disk, a mounting for said sound reproducer, a hollow arm movably connected with said mounting, a movable conduit pivotally supporting said arm, and arranged to oscillate in a vertical plane, bearings forming the center of oscillation of said movable conduit, a stationary conveyer provided with trunnions for said bearings, a link pivoted to said stationary conveyer, and to said arm in spaced relation from the pivotal connection of said arm and movable conduit, and the trunnions of said movable conduit, operative to maintain said arm in horizontal position to be reciprocated by the oscillatory movement of said movable conduit, and means to counterbalance said movable conduit, to afford a minimum pressure between said stylus and the walls of the record groove.

14. In a talking machine, the combination with a sound reproducer, of a stylus needle carried thereby, operative to engage a sound record disk, a mounting for said sound reproducer, a hollow arm movably connected with said mounting, a movable conduit pivotally supporting said arm, and arranged to oscillate in a vertical plane, bearings forming the center of oscillation of said movable conduit, a stationary conveyer provided with trunnions for said bearings, a link pivoted to said stationary conveyer and to said arm, in spaced relation from the pivotal connection of said arm and the trunnions of said movable conduit, operative to maintain said arm in horizontal position irrespective of the position of said movable conduit, and counterbalancing means carried by said movable conduit operative to counterbalance the same, and to minimize the pressure of said stylus needle on the wall of the record groove.

15. In a talking machine, the combination with a sound reproducer, of a stylus needle carried thereby and arranged to engage a sound record disk, a sound conveyer connected with said reproducer and comprising a stationary conduit, an elbow connected therewith having a curved flange, a swinging arm pivoted to said elbow, and provided on one end thereof with a curved flange conforming to the flange of said elbow, and arranged to seal the joint between said movable conduit and said elbow, a circular orifice in the opposite end of said arm, a tapered arm having a spherical region pivotally fitted into said orifice, and a mounting for said reproducer movably carried by said tapered arm, a link pivoted to said elbow and to said tapered arm, operative to maintain the latter in a horizontal position, and weights arranged to counterbalance the movable parts of said conveyer, and to reduce the lateral stress on said needle.

16. In a talking machine, the combination with a horizontal turn-table of a sound conveyer comprising a stationary section, a movable section connected to said stationary section and movable with respect thereto about a horizontal axis, and a hollow arm section connected to said movable section and movable with respect thereto about a horizontal axis, a sound reproducer mounted upon said hollow arm section and provided with a stylus arranged to engage a disk sound record upon said turntable and operative to have its point traverse a rectilinear path radial with respect to the axis of said disk.

17. In a talking machine, the combination of a sound record disk, a sound reproducer in engagement with said record, an arm arranged to swing in a vertical plane, and a supporting link arranged to maintain the axis of said sound reproducer parallel to the surface of the record disk throughout its passage in a rectilinear radial path across said sound record disk during the swinging movement of said arm.

18. In a talking machine, the combination of a sound box, a pivoted sound conveying tube arranged to oscillate in a vertical plane, a tube pivotally connected to said sound box and said pivoted sound conveying tube, and a supporting link operative to maintain the axis of said second named tube in horizontal position and parallel to to the plane of oscillation of said sound conveying tube throughout the passage of said sound box across a sound record.

19. In a talking machine, the combination with a sound reproducer, of a stylus needle carried thereby, a swinging arm arranged to oscillate in a vertical plane, a hollow connector between said arm and said reproducer, movable with respect to said arm, and means to maintain said hollow connector in a horizontal plane, said arm being coöperative with a sound record, to move the point of the stylus needle in a straight line radial to said record.

20. In a talking machine, the combination with a sound reproducer, of a stylus needle operatively connected therewith, and arranged to operatively engage a sound record disk, a sound conveyer, comprising a swinging arm arranged to oscillate in a vertical plane, a hollow connector pivoted thereto, and arranged to connect said reproducer therewith, and means operative to maintain said hollow connector in a horizontal position, said arm being arranged to coöperate with said record disk to move the point of the stylus needle in a straight line radial to the axis of rotation of said disk.

21. In a talking machine, the combination with a sound reproducer, of a stylus needle carried thereby arranged to engage a sound record disk, a swinging arm pivoted for oscillation in a vertical plane, a hollow connector between said reproducer and said arm, and means arranged to maintain said connector in a horizontal position to reciprocate in a substantially rectilinear path, operative to direct the point of the stylus needle in a straight line radial with respect to the axis of said record disk, the rotation of said record disk being operative to move said needle in said line.

22. In a talking machine, the combination with a sound reproducer, of a stylus needle operatively connected therewith arranged to engage a sound record disk, a sound conveyer comprising a stationary section, a relatively movable section arranged to oscillate in a vertical plane, and a pivoted connection between said movable section and said reproducer, arranged to reciprocate in a substantially straight line, and operative to direct the point of the stylus needle in a line radial to the axis of rotation of said sound record, the rotatiton of said record disk being operative to move said needle in said line.

23. In a talking machine, the combination with a sound reproducer, of a stylus needle carried thereby, operatively engaged with a sound record disk, a sound conveyer comprising a stationary section and a relatively movable section respectively having trunnions and bearings, and arranged for relative oscillation in a vertical plane, an arm connecting said movable section and said reproducer, arranged to reciprocate horizontally, and counterbalancing means carried by said movable section.

24. In a talking machine, the combination with a rotary disk record support, of stationary means, an arm connected to said stationary means and arranged to swing with respect thereto in a plane substantially perpendicular to said support, a connecting arm pivoted to said first mentioned arm and movable with respect thereto, a sound reproducer connected to said connecting arm and provided with a stylus arranged to coöperate with a record on said support, and supporting means connecting said connecting arm and said stationary means.

25. In a talking machine, the combination with a rotary disk record support, of stationary means, and arm connected to said stationary means and arranged to swing with respect thereto in a plane substantially perpendicular to said support, a connecting arm pivoted to said first mentioned arm and movable with respect thereto, a sound reproducer connected to said connecting arm and bodily movable with respect to said connecting arm toward and away from said support and provided with a stylus arranged to coöperate with a record on said support, and supporting means connecting said connecting arm and said stationary means.

26. In talking machine, the combination with a sound reproducer, of a stylus needle carried thereby, a swinging arm arranged to oscillate in a vertical plane, a connector between said arm and said reproducer movable with respect to said arm, and means to maintain said connector in a horizontal plane, said arm being coöperative with a sound record, to move the point of the stylus needle in a straight line radial to said record.

27. In a talking machine, the combination with a rotary disk record support, of sound reproducing means provided with a stylus arranged to coöperate with a disk record on said support, and means including an arm arranged to oscillate in a plane substantially perpendicular to a disk record on said support to direct the point of said stylus in a substantially straight line across a disk record on said support and to maintain said stylus perpendicular to said line, said arm being operative to be swung in said plane by the engagement of said stylus with a disk record on said support.

28. In a talking machine, the combination with a rotary disk record support, of sound reproducing means provided with a stylus arranged to coöperate with a disk record on said support, and means including a hollow sound conveying arm arranged to oscillate in a plane substantially perpendicular to a disk record on said support to direct the point of said stylus in a substantially straight line across a disk record on said support and to maintain said stylus perpendicular to said line, said arm being operative to be swung in said plane by the engagement of said stylus with a disk record on said support.

29. In a talking machine, the combination with a rotary disk record support, of sound reproducing means provided with a stylus arranged to coöperate with a disk record on said support, and means including an arm arranged to oscillate in a plane substantially perpendicular to a disk record on said support to direct the point of said stylus in a substantially straight line across and substantially radially with respect to a disk record on said support and to maintain said stylus perpendicular to said line, said arm being operative to be swung in said plane by the engagement of said stylus with a disk record on said support.

Signed by us, the said ELDRIDGE R. JOHNSON and JOHN C. ENGLISH, at Camden, State of New Jersey, this 6th day of October, 1910.

ELDRIDGE R. JOHNSON.
JOHN C. ENGLISH.

Witnesses:
RALPH LINDSAY FREEMAN,
FRANK BARCLAY MIDDLETON, Jr.

---

It is hereby certified that in Letters Patent No. 1,075,288, granted October 7, 1913, upon the application of Eldridge R. Johnson, of Merion, Pennsylvania, and John C. English, of Camden, New Jersey, for an improvement in "Talking-Machines," errors appear in the printed specification requiring correction as follows: Page 4, line 30, for the word "operatitve" read *operative;* page 5, line 3, for the word "horizantal" read *horizontal;* same page, line 59, for the word "rotatiton" read *rotation;* same page, line 89, for the word "and" read *an;* and line 103, before the word "talking" insert the article *a;* and that the said Letters Patent should be read with these corrections therein that the same may conform to the record of the case in the Patent Office.

Signed and sealed this 14th day of October, A. D., 1913.

[SEAL.]

R. T. FRAZIER,

*Acting Commissioner of Patents.* said support, and means including a hollow sound conveying arm arranged to oscillate in a plane substantially perpendicular to a disk record on said support to direct the point of said stylus in a substantially straight line across a disk record on said support and to maintain said stylus perpendicular to said line, said arm being operative to be swung in said plane by the engagement of said stylus with a disk record on said support.

29. In a talking machine, the combination with a rotary disk record support, of sound reproducing means provided with a stylus arranged to coöperate with a disk record on said support, and means including an arm arranged to oscillate in a plane substantially perpendicular to a disk record on said support to direct the point of said stylus in a substantially straight line across and substantially radially with respect to a disk record on said support and to maintain said stylus perpendicular to said line, said arm being operative to be swung in said plane by the engagement of said stylus with a disk record on said support.

Signed by us, the said ELDRIDGE R. JOHNSON and JOHN C. ENGLISH, at Camden, State of New Jersey, this 6th day of October, 1910.

ELDRIDGE R. JOHNSON.
JOHN C. ENGLISH.

Witnesses:
RALPH LINDSAY FREEMAN,
FRANK BARCLAY MIDDLETON, Jr.

---

Corrections in Letters Patent No. 1,075,288.

It is hereby certified that in Letters Patent No. 1,075,288, granted October 7, 1913, upon the application of Eldridge R. Johnson, of Merion, Pennsylvania, and John C. English, of Camden, New Jersey, for an improvement in "Talking-Machines," errors appear in the printed specification requiring correction as follows: Page 4, line 30, for the word "operatitve" read *operative;* page 5, line 3, for the word "horizantal" read *horizontal;* same page, line 59, for the word "rotatiton" read *rotation;* same page, line 89, for the word "and" read *an;* and line 103, before the word "talking" insert the article *a;* and that the said Letters Patent should be read with these corrections therein that the same may conform to the record of the case in the Patent Office.

Signed and sealed this 14th day of October, A. D., 1913.

[SEAL.]

R. T. FRAZIER,

*Acting Commissioner of Patents.*

Corrections in Letters Patent No. 1,075,288.

It is hereby certified that in Letters Patent No. 1,075,288, granted October 7, 1913, upon the application of Eldridge R. Johnson, of Merion, Pennsylvania, and John C. English, of Camden, New Jersey, for an improvement in "Talking-Machines," errors appear in the printed specification requiring correction as follows: Page 4, line 30, for the word "operatitve" read *operative;* page 5, line 3, for the word "horizantal" read *horizontal;* same page, line 59, for the word "rotatiton" read *rotation;* same page, line 89, for the word "and" read *an;* and line 103, before the word "talking" insert the article *a;* and that the said Letters Patent should be read with these corrections therein that the same may conform to the record of the case in the Patent Office.

Signed and sealed this 14th day of October, A. D., 1913.

[SEAL.]

R. T. FRAZIER,

*Acting Commissioner of Patents.*